US011579574B2

(12) United States Patent
Wee et al.

(10) Patent No.: US 11,579,574 B2
(45) Date of Patent: Feb. 14, 2023

(54) CONTROL CUSTOMIZATION SYSTEM, CONTROL CUSTOMIZATION METHOD, AND CONTROL CUSTOMIZATION PROGRAM

(71) Applicant: NEC Corporation, Tokyo (JP)

(72) Inventors: Werner Wee, Tokyo (JP); Yoshio Kameda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 280 days.

(21) Appl. No.: 16/349,315

(22) PCT Filed: Feb. 10, 2017

(86) PCT No.: PCT/JP2017/004996
§ 371 (c)(1),
(2) Date: May 13, 2019

(87) PCT Pub. No.: WO2018/146802
PCT Pub. Date: Aug. 16, 2018

(65) Prior Publication Data
US 2020/0192307 A1 Jun. 18, 2020

(51) Int. Cl.
G05B 13/04 (2006.01)
G06N 20/00 (2019.01)
G06N 5/00 (2006.01)
G06N 5/04 (2006.01)
(Continued)

(52) U.S. Cl.
CPC ........... *G05B 13/048* (2013.01); *G06N 5/003* (2013.01); *G06N 5/04* (2013.01); *G06N 20/00* (2019.01); *B60W 30/182* (2013.01); *B60W 50/082* (2013.01); *B60W 2540/215* (2020.02); *G05B 13/041* (2013.01); *G05B 13/042* (2013.01)

(58) Field of Classification Search
None
See application file for complete search history.

(56) References Cited

U.S. PATENT DOCUMENTS 8,948,954 B1 2/2015 Ferguson et al.
2004/0252027 A1* 12/2004 Torkkola ............... G08B 21/06
340/576

(Continued)

FOREIGN PATENT DOCUMENTS

JP H01-119440 A 5/1989
JP 2007-052778 A 3/2007
(Continued)

OTHER PUBLICATIONS

International Search Report for PCT Application No. PCT/JP2017/004996, dated May 9, 2017.
Written opinion for PCT Application No. PCT/JP2017/004996.

*Primary Examiner* — Mohammad Ali
*Assistant Examiner* — David Earl Ogg
(74) *Attorney, Agent, or Firm* — Sughrue Mion, PLLC

(57) ABSTRACT

A control customization system 80 customizes a plant control. A profiler 81 predicts actions of a user depending on situations of the plant or the user. A planner 82 determines an appropriate set of objectives which represent tasks desired by the user, and objective terms representing elements for controlling the plant so as to realize the objectives, and tunes the objective terms based on predictions of the profiler 81.

12 Claims, 7 Drawing Sheets

(51) Int. Cl.
*B60W 30/182* (2020.01)
*B60W 50/08* (2020.01)

(56) References Cited

U.S. PATENT DOCUMENTS

| | | | |
|---|---|---|---|
| 2007/0043491 A1* | 2/2007 | Goerick | G06K 9/00805 |
| | | | 701/41 |
| 2009/0216590 A1* | 8/2009 | Hintz | G06Q 10/06 |
| | | | 705/7.36 |
| 2009/0240366 A1* | 9/2009 | Kaushal | G06N 20/00 |
| | | | 700/110 |
| 2010/0228420 A1 | 9/2010 | Lee | |
| 2010/0306001 A1* | 12/2010 | Discenzo | G05B 13/024 |
| | | | 705/7.37 |
| 2015/0371095 A1* | 12/2015 | Hartmann | G06K 9/00791 |
| | | | 348/148 |
| 2016/0328655 A1* | 11/2016 | Adams | G06N 20/00 |
| 2017/0177739 A1* | 6/2017 | Algotar | G06N 5/02 |

FOREIGN PATENT DOCUMENTS

| | | | |
|---|---|---|---|
| JP | 2010-083402 A | | 4/2010 |
| JP | 2010-155528 A | | 7/2010 |
| JP | 2010155528 A | * | 7/2010 |

\* cited by examiner

US 11,579,574 B2

CONTROL CUSTOMIZATION SYSTEM, CONTROL CUSTOMIZATION METHOD, AND CONTROL CUSTOMIZATION PROGRAM

This application is a National Stage Entry of PCT/JP2017/004996 filed on Feb. 10, 2017, the contents of all of which are incorporated herein by reference, in their entirety.

TECHNICAL FIELD

The present invention relates to a control customization system, control customization method, and control customization program for learning, applying and switching between customized or personalized performance measures or preference parameters for automated decision making, optimization and control.

BACKGROUND ART

In recent years, control systems are becoming increasingly sophisticated at performing single or multiple tasks with minimal operator input or intervention. For example, in modern vehicles, cruise control systems have been developed so that vehicle operators can set some desired speed and maintain it without the operator adjusting the throttle. In other advanced vehicles, adaptive cruise control systems have been developed for not only maintaining the desired speed but also for automatically adjusting the vehicle's velocity depending on whether preceding vehicles have been detected by the car's sensors. Fully automated vehicles have also been successfully tested to drive in simulated urban traffic while satisfying many road rules and requirements.

As advanced control systems become mainstream, it is required for them to become completely autonomous and to be able to pursue several objectives simultaneously. However, for them to also gain wide and rapid acceptance, it is also desirable for them to be able to learn and calculate control strategies that are more customized and personalized to suit different operators' requirements and/or preferences.

In standard control systems, an example of which is described in PLT1, it is usually considered that the optimal control inputs are the solution to a fixed set of objectives based on well-defined physical or temporal quantities. In general, the objective terms are based on first principles, and the control systems can have a large number of simultaneous objectives some of which can have highly complex expressions, which can lead to high computational cost.

The objectives of plant operators may vary depending on the state of the plant and other measurements. What objectives to pursue at each time and how intense or strong the objectives should be accomplished can be highly subjective and depend on the requirements of the operator. The manner in which operators pursue similar yet different objectives makes the calculated control strategies or inputs personalized or customized depending on the operator's preference or expertise.

PLT 2 discloses a vehicle speed control device that controls the vehicle speed of a vehicle based on a target vehicle speed. The device disclosed in PLT 2 changes the target vehicle speed based on the estimated characteristics of the driver and the acquired road shape.

Note that PLT 3 discloses methods and systems for modifying vehicle behavior based on confidence in lane estimation.

CITATION LIST

Patent Literature

[PTL 1]
U.S. Unexamined Patent Application Publication No. 2010/0228420 A1
[PTL 2]
Japanese Patent Application Laid-Open No. 2010-083402
[PTL 3]
U.S. Pat. No. 8,948,954 B1

SUMMARY OF INVENTION

Technical Problem

As the number of objectives increase and as the order and/or intensity to which to pursue them are required to generate realistic and personalized control strategies, conventional approaches, as the method disclosed in PLT 1, are somewhat limited due to their usual dependence on vehicle states, or road and environment type.

To enhance the controller performance and to obtain more personalized strategies, it is desirable to include the preferences or behavioral patterns of the users or operators of the plant (similar to PLT 2) in determining the appropriate set of objectives, i.e., which choice of objectives to pursue and how each objective is important relative to other terms in the cost function.

The subject matter of the present invention is directed to realizing the above features in order to overcome, or at least reduce the effects of, one or more of the problems set forth above.

That is, it is an exemplary object of the present invention to provide a control customization system, control customization method and control customization program capable of balancing, customizing and personalizing plant and controller performance.

Solution to Problem

A control customization system according to the present invention is a control customization system which customizes a plant control, the control customization system includes: a profiler which predicts actions of a user depending on situations of the plant or the user; and a planner which determines an appropriate set of objectives which represent tasks desired by the user, and objective terms representing elements for controlling the plant so as to realize the objectives, and tunes the objective terms based on predictions of the profiler.

A control customization method according to the present invention is a control customization method which customizes a plant control, the control customization method includes: predicting actions of a user depending on situations of the plant or the user; determining an appropriate set of objectives which represent tasks desired by the user, and objective terms representing elements for controlling the plant so as to realize the objectives; and tuning the objective terms based on the predictions.

A control customization program according to the present invention is a control customization program mounted on a computer which customizes a plant control, the program causing the computer to perform: a profiling processing of predicting actions of a user depending on situations of the plant or the user; and a planning processing of determining an appropriate set of objectives which represent tasks desired by the user, and objective terms representing elements for controlling the plant so as to realize the objectives, and tuning the objective terms based on predictions of the planning processing.

Advantageous Effects of Invention

According to the present invention, control inputs based on a customized or personalized set of objectives or weights that will suit the preferences of the plant operator or user more closely can be obtained.

It depicts a block diagram illustrating the structure of a first exemplary embodiment of a control customization system according to the present invention.

FIG. 2

It depicts an explanatory diagram illustrating the structure of a first exemplary embodiment of a control customization system according to the present invention.

FIG. 3

It depicts an explanatory diagram illustrating an example of the profile.

FIG. 4

It depicts a flowchart illustrating an operation example of the customization system.

FIG. 5

It depicts an explanatory diagram illustrating an operation example of this specific example.

FIG. 6

It depicts an explanatory diagram illustrating the structure of a second exemplary embodiment of a control customization system according to the present invention.

FIG. 7

It depicts a block diagram illustrating an overview of a control customization system according to the present invention.

DESCRIPTION OF EMBODIMENTS

The following describes an exemplary embodiment of the present invention with reference to drawings. The present invention relates to a method and system for creating a customized or personalized set of objectives for more realistic or personal control. The preferred and alternative embodiments, and other aspects of subject matter of the present disclosure will be best understood with reference to a detailed description of specific embodiments, which follows, when read in conjunction with the accompanying drawings.

The following discussion of the embodiments of the present disclosure directed to a method and system for creating a customized or personalized control objective is merely exemplary in nature, and is in no way intended to limit the disclosure or its applications or uses. Exemplary embodiments of the present invention will be described below with reference to the drawings.

First Exemplary Embodiment

Figure 1:
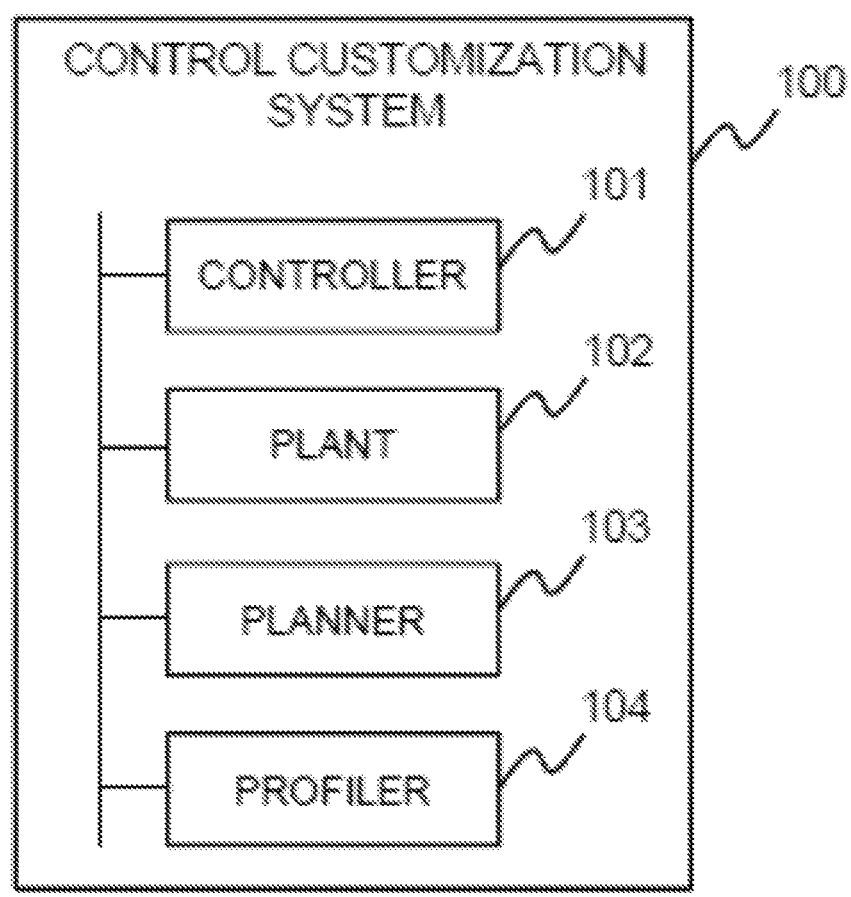
FIG. 1
Figure 2:
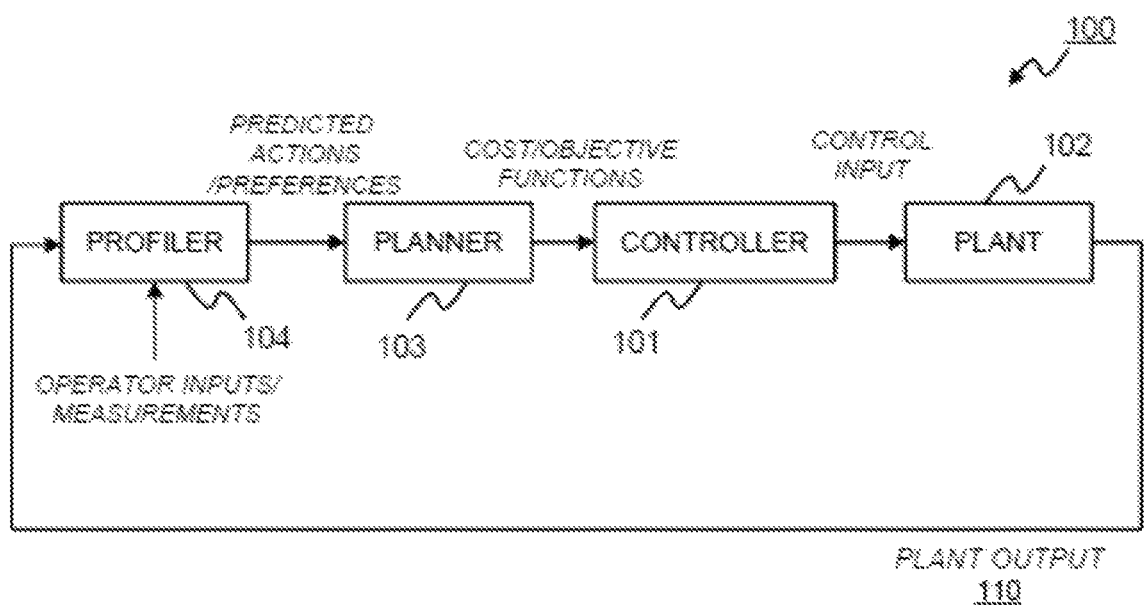

FIG. 1 is an exemplary block diagram illustrating the structure of a first exemplary embodiment of the control customization system according to the present invention. FIG. 2 is an exemplary explanatory diagram illustrating the structure of a first exemplary embodiment of the control customization system according to the present invention. The control customization system of the present embodiment customizes a plant control.

The control customization system 100 according to the present exemplary embodiment includes a controller 101, a plant 102, a planner 103, and a profiler 104. According to the present exemplary embodiment, the controller 101 controls the plant 102.

The plant 102 sends plant outputs 110 to the profiler 104. The plant outputs 110 are acquired by the sensor (not shown) of the plant 102. The plant 102 may acquire disturbances as the plant outputs 110.

The profiler 104 predicts actions of a user depending on situations of the plant 102 and/or the user. The situation of the plant 102 is, for example, the state (specifically, the speed, the position, the acceleration, etc.) of the plant 102 acquired by the sensor, the environment to be observed, and the like. The user's situation is, for example, the driving situation of the user, body temperature, blood pressure, and the like.

Specifically, the profiler 104 contains a decision or regression tree profile that has been learned using data collected by the plant 102 during operation by the user or by similar users. The profiler 104 predicts actions of the user by using the profile. A linear model may be used as the predictors in the nodes in the decision or regression tree profile. As a result, the profiler 104 chooses the most important actions from among a multitude of possible objectives for the plant 102 based on the learned profile or preferences of the user or operator.

The profiler 104 may update the profile based on data collected by the plant 102. The profile can also be updated as the plant 102 collects more data when the specific user operates the plant 102.

The profiler 104 may learn or update decision trees associated to a user by applying machine learning techniques such as ensemble methods on collected data. To more accurately describe or predict the actions of a user, the profile of the plant operator or user can be based on combinations of classification and regression trees.

Compared to neural networks and deep learning models, using classification and regression trees for learning profiles has the advantage of being easier to interpret and possibly easier to verify and test. Moreover, if the relation of features to maneuvers can be accurately learned, the profile can be used as a guide for improving or correcting habits of a specific operator/driver.

As an example, based on data collected on a network of drivers, the profiler 104 may use machine learning to create profiles or categories based on age, physical conditions, measurements and other features and relate those to aggressiveness or conservativeness in taking certain driving maneuvers, e.g., tendency to change lanes based on current vehicle states and some elements based on the environment and traffic participants.

Then, based on the features detected on the current user, the profiler 104 may start with a profile based on a combination of trees that relate to each of the user's features and continually update it based on user feedback or measured activity from sensors of the plant 102.

Moreover, the profiler 104 may contain default profiles that can be used based on certain inputs or measurements from the operator or user. At each time, the profiler 104 accepts the plant outputs 110 and predicts the control actions taken by the operator or user, and predicts the values of quantities relevant to the plant optimization.

The profiler 104 may predict relative importance between different quantities relevant to the control of the plant 102. That is, the profiler 104 may consider the relative importance of the quantities or actions based on the plant state Similar to the prediction of actions, a predictive model of the importance between quantities can be learned or constructed from data.

Figure 3:
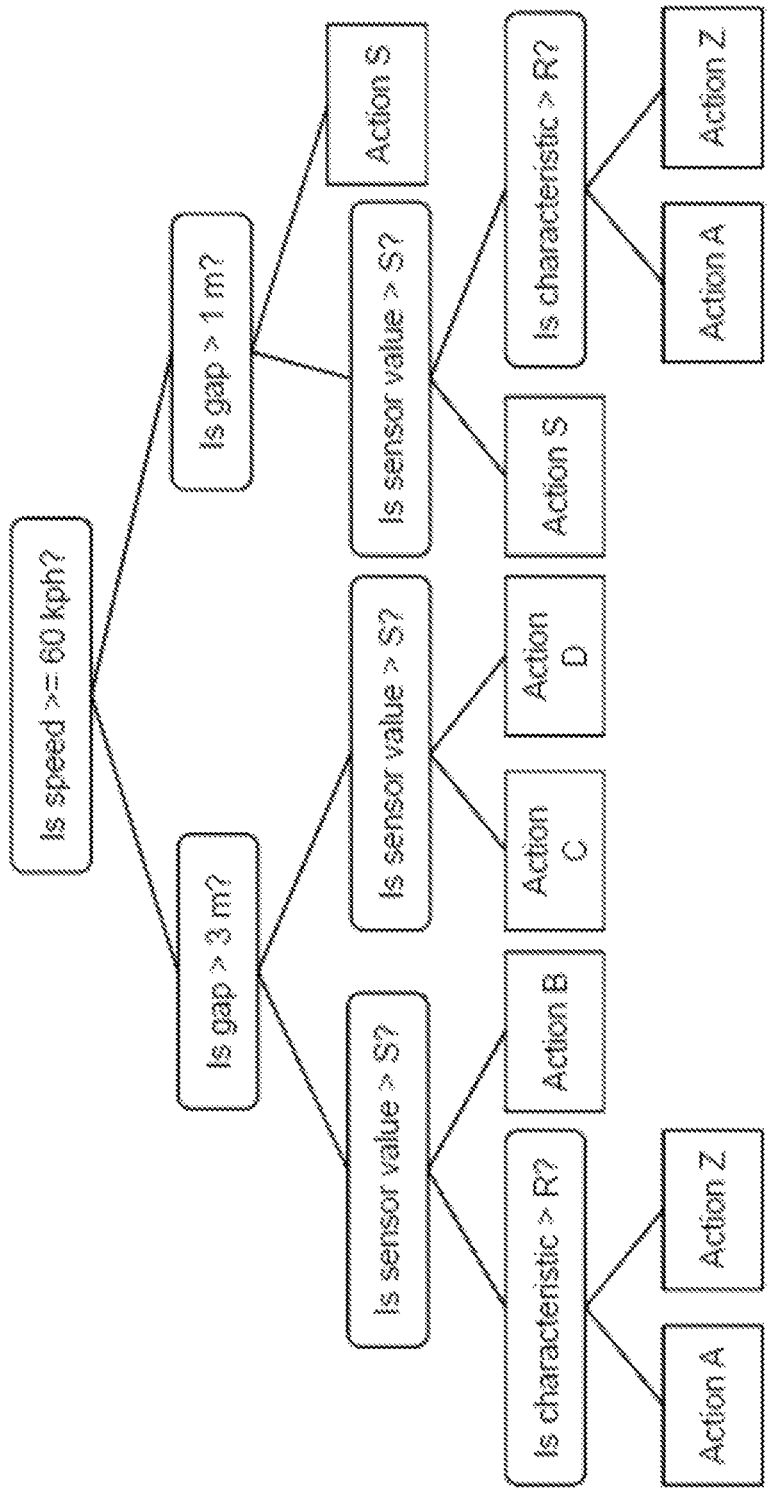

FIG. 3 is an explanatory diagram depicting an example of the profile. In the example shown in FIG. 3, the profile is defined by a decision tree, the predicted action is set to a leaf (leaf), and the branching condition of each node is a sensor value. The profiler 104 predicts the action of the user by using the profile represented by the decision tree as exemplified in FIG. 3 that specifies the action of the user according to the situation.

The planner 103 creates a control plan of the plant 102 that is optimum for the user based on the predicted behavior of the user. That is, the planner 103 creates an optimum plan for the controller 101 to control the plant 102 from the viewpoint of the user.

Specifically, the planner 103 uses the outputs or predictions of the profiler 104 to determine the appropriate set of objectives and the necessary weights or tuning parameters in order to obtain control strategies that closely reflect the personal preferences or features of the operator. The planner 103 then outputs the set of objectives to the controller 101 for the calculation of the control inputs to be applied to the plant 102.

First, the planner 103 decides a task desired by the user as objective. The planner 103 determines elements (hereinafter referred to as objective terms) for controlling the plant 102 so as to realize the task (objective). Examples of tasks that the user desires include going to a destination, maximizing comfort, saving fuel etc. In other words, "objective" is a task that get associated with some quantities or formulas that can be derived from their definition or using first principles, which the user wants to optimize.

Then, the planner 103 tunes the determined objective terms to create a control plan of the plant 102 that is optimum for the user. For example, the control plan is represented by a cost function added by weighting the determined objective terms. The planner 103 may update the objective function online. The weights reflect the relative importance between objective terms, and an expert system can be constructed or a model can be learned from data to determine such weights given a certain plant situation.

The cost function is composed of different objective terms some of which are based on first principles, such as for tracking desirable state values, and some are learned/constructed from data. For example, by default, the cost function may involve destination, velocity and acceleration tracking, and jerk minimization terms which can be constructed analytically, and/or fuel consumption and comfort maximization terms which can also be learned from data.

For example, the planner 103 by default contains a set of actions or driving maneuvers that the car or driver can perform in a given situation, e.g., move left, move right, move forward. Given a certain driving situation, the profiler 104 predicts the maneuver and the intensity to which the driver would have reacted. Then the planner 103 uses those predictions to activate or increase the importance of certain quantities or formulas related to the predicted maneuvers for finalizing the overall objective to be solved in an optimizer.

More specifically, as the profile from the profiler 104 can be based on a combination of classification and regression trees, for each instant, the planner 103 obtain predicted moves, magnitude or aggressiveness, and the planner 103 may deactivate all (objective) terms that are not relevant to the predicted moves by setting for example their regularization parameters to zero. The remaining terms are the ones which are active, and based on some expert system or learned mechanism, the planner 103 may choose or use appropriate values of the weights or regularization parameters for constructing the overall cost function.

Note that the feasibility of the merging maneuver, or any other maneuver in general, can be evaluated using first principles. As we obtain measurements of the states of the car and other traffic participants, we can calculate different quantities related to spatial and temporal requirements of a successful merging or driving maneuver, e.g., space and gap requirements for each of the objects in a given situation. Based on such quantities an expert system can be built, and assuming more data can be collected, the expert system can be updated or can be combined with a learned mechanism that evaluates the feasibility of each kind of driving maneuver.

The planner 103 then outputs the set of objectives to the controller 101 for the calculation of the control inputs to be applied to the plant 102. For example, the output of the planner 103 refers to the set of objective terms or formulas, together with their associated weights or regularization parameters, such as let's say a formula for fuel consumption and a weight of 10.

In addition, when the profiler 104 predicts the importance between different quantities, the planner 103 may determine the control plan using the importance. The relative importance predicted by the profiler 104 will then be used as input to the planner 103 which translates such information to appropriate values to be used in the regularization parameters of the corresponding objective terms.

The controller 101 controls the plant 102 by optimizing a cost function involving the combination of the objective terms and their corresponding tuning weights.

The controller 101, the planner 103, and the profiler 104 are implemented by a CPU of a computer that operates according to a program (control customization program). For example, the program is stored in a storage (not illustrated) in the control customization system. The CPU may read the program and thereby operate as the controller 101, the planner 103, and the profiler 104 according to the program. Alternatively, each of the controller 101, the planner 103, and the profiler 104 may be implemented by separate dedicated hardware.

Figure 4:
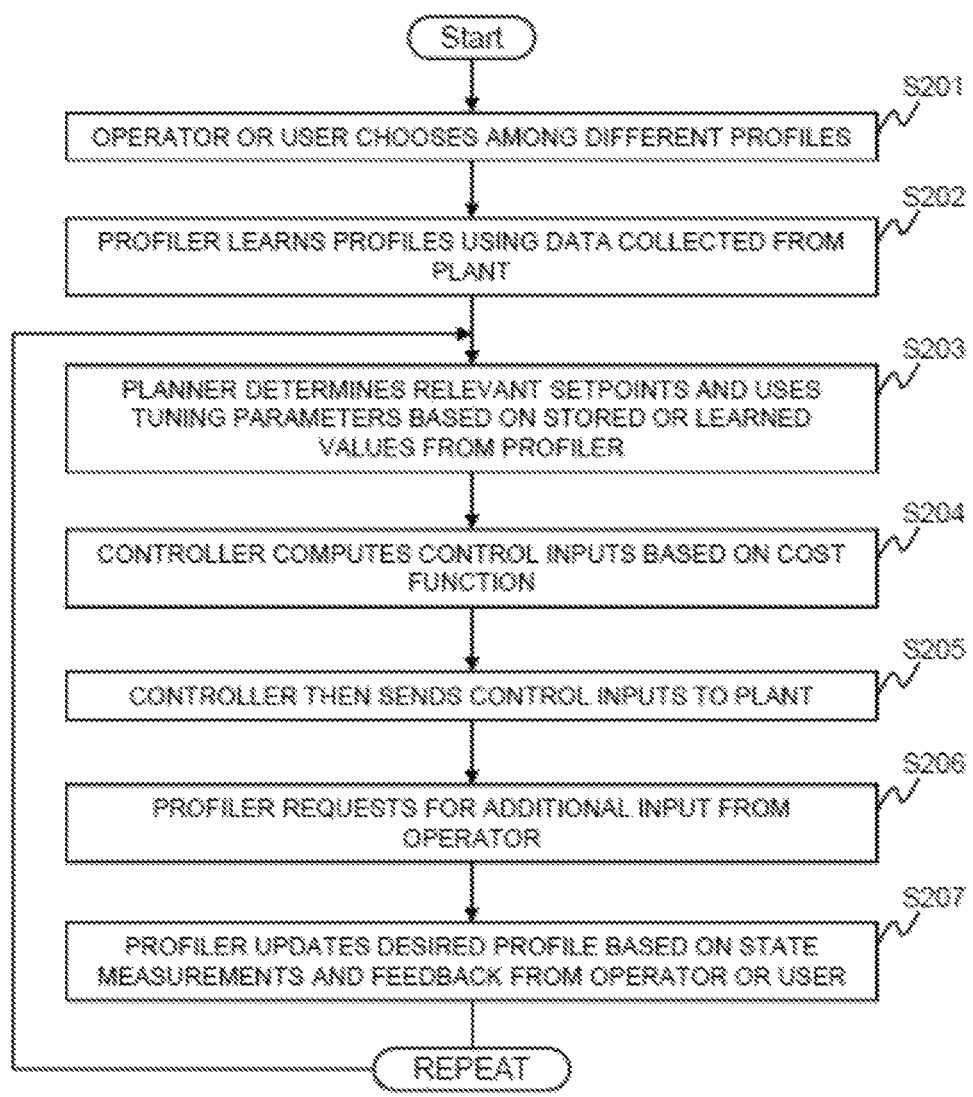

The following describes an example of the control customization system in this exemplary embodiment. FIG. 4 is a flowchart illustrating an operation example of the control customization system in this exemplary embodiment. Now consider a semi or fully automated driving scenario where the controlled variables are the front wheel steering angle and longitudinal speed.

If desired, at S201, the operator or user can choose among different profiles. That is, a default profile can be used. The operator may input preferences using a plant user interface.

At S202, The profiler 104 may learn profiles using data collected from the plant 102.

At S203, the profiler 104 reads the plant outputs 110, and uses the stored decision or regression trees to predict the action that should be taken by the operator. The profiler 104 also determines the relative importance between the terms and the values of the quantities related to the multiple objectives or actions taken by the user. The planner 103 determines relevant setpoints and uses tuning parameters based on stored or learned values from the profiler 104. That is, the planner 103 then takes the appropriate set of objectives (e.g. cost function) and sends the set to the controller 101.

At S204, the controller 101 then computes the control inputs based on the cost function assembled at the previous step.

At S205, the controller 101 then sends the control inputs to the plant 102 for actuation.

At S206, the profiler 104 may then request for additional input from the operator if desired.

At S207, the profiler 104 may update the desired profile based on state measurements and feedback from the operator or user.

In this manner, in the present exemplary embodiment, the profiler 104 predicts actions of a user depending on situations of the plant 102 or the user, and the planner 103 determines an appropriate set of objectives which represent tasks desired by the user, and objective terms representing elements for controlling the plant so as to realize the objectives, and tunes the objective terms based on predictions of the profiler 104.

With the above structure, control inputs based on a customized combination of objectives can be calculated and a more personalized control strategy can be realized and applied to the plant.

Figure 5:
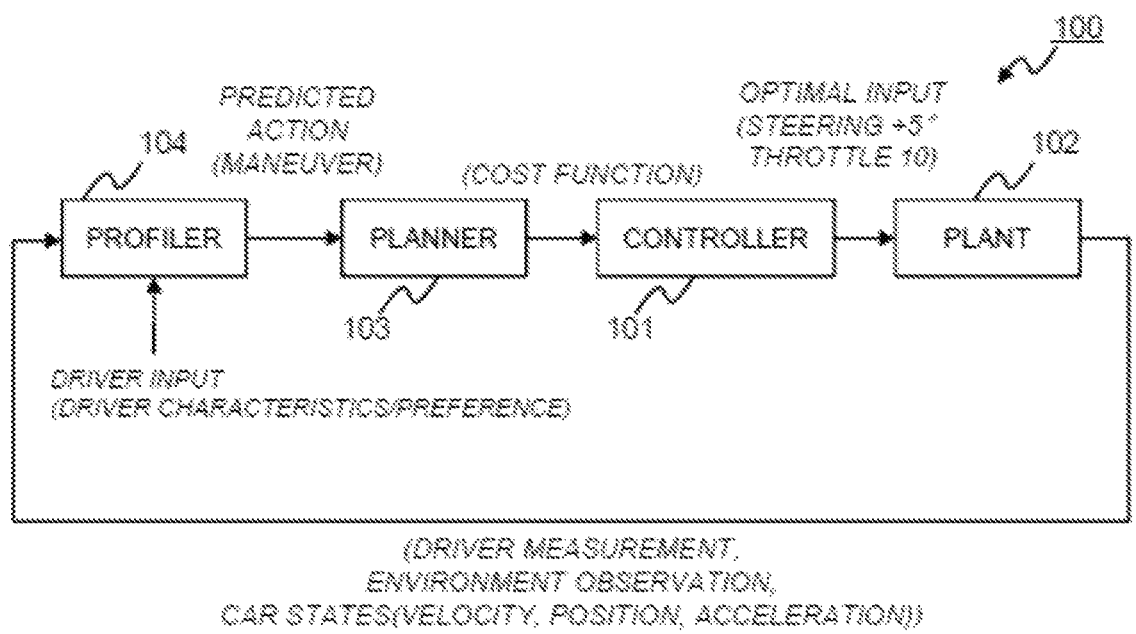

Specific examples of this embodiment will be described below. FIG. 5 is an explanatory diagram illustrating an operation example of this specific example.

As a specific example, consider the case where the passengers desire a slow moving vehicle: Using a car user interface, the passengers can choose a conservative driving profile, which may correspond to certain default constraints such as three-degree limitation for steering rate and a 0.1 g limit for acceleration. The other parameters can be controlled using input devices such as those used for volume control. For example, as shown in FIG. 5, the profiler 104 receives the driver characteristic/preference as an input from the driver.

The profiler 104 then outputs a learned decision tree profile that involves the intensity or importance of velocity tracking or aggressiveness to merge to the planner 103. The profiler 104 may also store and learn tendency to change lanes or merge based on the driver features and send such information to the planner 103. For example, as shown in FIG. 5, the profiler 104 outputs a maneuver of the user as a predicted action.

The planner 103 then determines the feasibility of the merging maneuver, chooses required longitudinal or lateral targets, and associates the weights based on the profile to the regularization parameters of the cost function. The planner 103 inputs the generated cost function to the controller 101.

The controller 101 inputs a result (for example, steering/throttle) obtained by optimizing the cost function to the plant 102. Once the controller 101 computes the optimal steering/throttle and after application to the actuator, the system may estimate the passenger response or directly request feedback from the passengers to further adjust certain aspects of the driving profile.

Second Exemplary Embodiment

Figure 6:
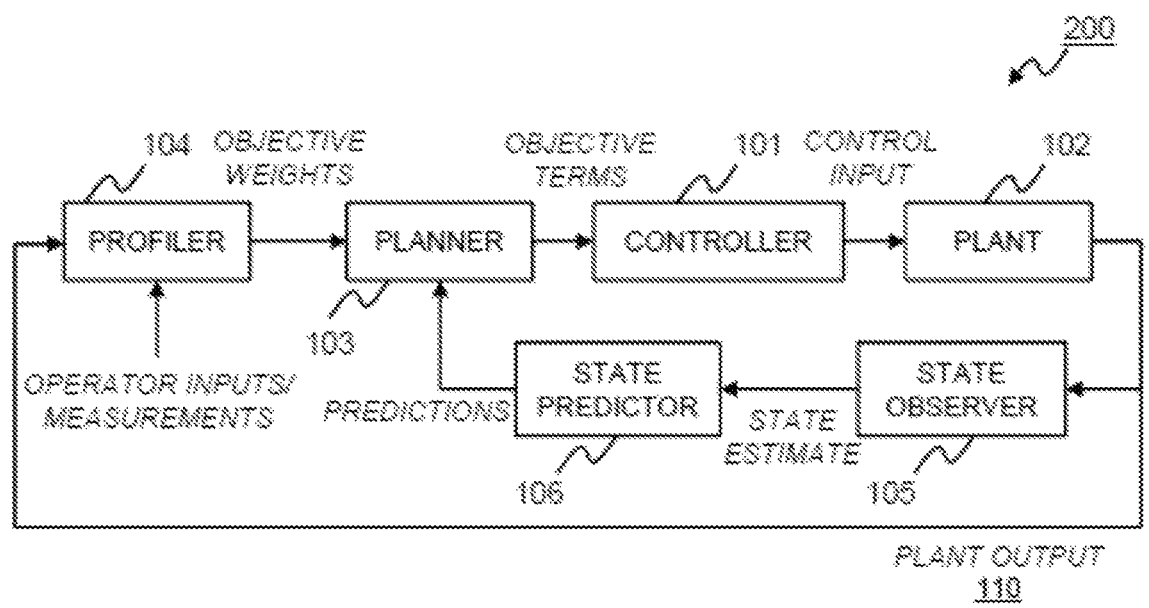

Next, a second embodiment of the control customizing system according to the present invention will be described. FIG. 6 is an explanatory diagram illustrating the structure of a second exemplary embodiment of a control customization system according to the present invention.

The control objective customization system 200 according to the present exemplary embodiment includes a controller 101, a plant 102, a planner 103, a profiler 104, state observer 105, and state predictor 106.

That is, in addition to the control customizing system of the first embodiment, the control customizing system of this embodiment further includes a state observer 105 and a state predictor 106. The rest of the configuration is the same as in the first embodiment.

The state observer 105 receives the plant output 110 from the plant 102 and estimates various states of the plant 102. The state observer 105 transmits the estimation result to the state predictor 106.

The state predictor 106 predicts the state of the plant 102 based on the estimation result received from the state observer 105. The state predictor 106 transmits the prediction result to the planner 103. The way the state predictor 106 predicts the state of the plant 102 is arbitrary, and a widely known method is used.

The planner 103 further uses the prediction result received from the state predictor 106 to create a control plan of the plant 102.

With the above configuration, it is possible to create a control plan using information that cannot be directly acquired from the plant 102.

Figure 7:
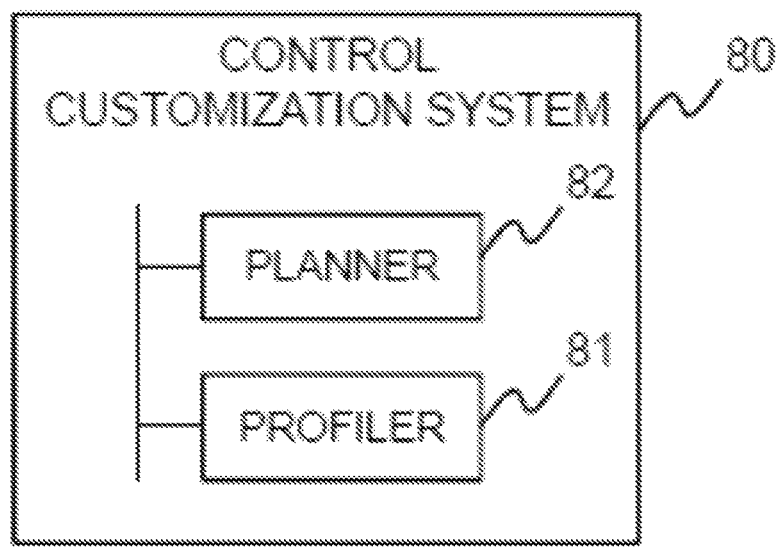

Next, an overview of the present invention will be described. FIG. 7 depicts a block diagram illustrating an overview of a control customization system of the present invention. A control customization system according to the present invention is a control customization system 80 (for example control customization system 100) which customizes a plant (for example the plant 102) control, the control customization system includes: a profiler 81 (for example the profiler 104) which predicts actions of a user depending on situations of the plant or the user; and a planner 82 (for example the planner 103) which determines an appropriate set of objectives which represent tasks desired by the user, and objective terms representing elements for controlling the plant so as to realize the objectives, and tunes the objective terms based on predictions of the profiler 81.

With the above structure, control inputs based on a customized combination of objectives can be calculated and a more personalized control strategy can be realized and applied to the plant.

Moreover, the control customization system may include a controller (for example the controller 101) which controls the plant by optimizing the tuned objective terms.

Moreover, the profiler 81 may predict the action of the user by using a profile represented by a decision tree or a classification tree specifying the action of the user according to the situation.

Moreover, the profiler 81 may update the profile based on the data collected by the plant by the operation of the user.

Moreover, the profiler 81 may predict relative importance between different quantities relevant to the control of a plant, and the planner 82 may determine the appropriate set of objectives and the objective terms based on the relative importance.

Moreover, the planner 82 may determine an objective function to be used for optimization of the plant control by using an expert system that determines the content of an objective term according to an action of the user.

Moreover, based on the current and predicted plant situation, the profiler 81 may choose the most important actions from among a multitude of possible objectives for the plant based on the learned profile or preferences of the user or an operator.

Moreover, the planner 82 may update a cost function online using linear objectives predicted or obtained from the learned decision or regression tree.

The foregoing description of preferred and alternative embodiments is not intended to limit or restrict the scope or applicability of the inventive concepts of the present disclosure. One skilled in the art will readily recognize from such discussion and from the accompanying drawings and claims that various changes, modifications and variations can be made therein without departing from the spirit and scope of the disclosure as defined in the following claims.

REFERENCE SIGNS LIST

100, 200 Control customization system
101 Controller
102 Plant
103 Planner
104 Profiler
105 State observer
106 State predictor
110 Output

What is claimed is:

1. A control customization system which customizes a plant control, the control customization system comprising:
    a hardware implemented processor;
    a profiler, implemented by the processor, which predicts actions of a user depending on situations of the plant or the user by using a profile that specifies the action of the user according to the situation and is based on a combination of a classification tree and a regression tree, and predicts relative importance between different quantities relevant to the control of a plant; and
    a planner, implemented by the processor, which determines an appropriate set of objectives which represent tasks desired by the user, and objective terms representing elements for controlling the plant so as to realize the objectives, and tunes the objective terms based on predictions of the profiler, and which determines the appropriate set of objectives and the objective terms based on the relative importance;
    wherein the planner deactivates all objective terms that are not relevant to the predicted actions by setting a regularization parameter of the objectives to zero.

2. The control customization system according to claim 1, further comprising:
    a controller, implemented by the processor, which controls the plant by optimizing the tuned objective terms.

3. The control customization system according to claim 1, wherein the profiler predicts the action of the user by using the profile represented by a decision tree specifying the action of the user according to the situation.

4. The control customization system according to claim 3, wherein the profiler updates the profile based on the data collected by the plant in response to an operation of the user.

5. The control customization system according to claim 1, wherein the planner determines an objective function to be used for optimization of the plant control by using an expert system that determines the content of an objective term according to an action of the user.

6. The control customization system according to claim 1, wherein based on the current and predicted plant situation, the profiler chooses one action from among a multitude of possible objectives for the plant based on the learned profile or preferences of the user or an operator.

7. The control customization system according to claim 1, wherein the planner updates a cost function on the control customization system using linear objectives predicted or obtained from a learned decision tree or a regression tree.

8. A control customization method which customizes a plant control, the control customization method comprising:
    predicting actions of a user depending on situations of the plant or the user by using a profile that specifies the action of the user according to the situation and is based on a combination of a classification tree and a regression tree, and predicting relative importance between different quantities relevant to the control of a plant;
    determining an appropriate set of objectives which represent tasks desired by the user, and objective terms representing elements for controlling the plant so as to realize the objectives;
    tuning the objective terms based on the predictions;
    determining the appropriate set of objectives and the objective terms based on the relative importance; and
    deactivating all objective terms that are not relevant to the predicted actions by setting a regularization parameter of the objectives to zero.

9. The control customization method according to claim 8, further comprising:
    controlling the plant by optimizing the tuned objective terms.

10. A non-transitory computer readable information recording medium storing a control customization program mounted on a computer which customizes a plant control, the program, when executed by a processor, performs a method for:
    predicting actions of a user depending on situations of the plant or the user by using a profile that specifies the action of the user according to the situation and is based on a combination of a classification tree and a regression tree, and predicting relative importance between different quantities relevant to the control of a plant;
    determining an appropriate set of objectives which represent tasks desired by the user, and objective terms representing elements for controlling the plant so as to realize the objectives;
    tuning the objective terms based on predictions;
    determining the appropriate set of objectives and the objective terms based on the relative importance; and
    deactivating all objective terms that are not relevant to the predicted actions by setting a regularization parameter of the objectives to zero.

11. The non-transitory computer readable information recording medium according to claim 10, further comprising controlling the plant by optimizing the tuned objective terms.

12. The control customization system according to claim 1, wherein
    the profiler outputs the profile of a learned classification tree that involves an intensity or an importance of velocity tracking, or an aggressiveness to merge, and
    the planner determines a feasibility of a merging maneuver, chooses required longitudinal or lateral targets, and associates a weight based on the output profile to the regularization parameters.

* * * * *